(12) United States Patent
Carson, Jr. et al.

(10) Patent No.: US 7,792,800 B1
(45) Date of Patent: Sep. 7, 2010

(54) DATA REPOSITORY UPGRADE PROCESS

(75) Inventors: Keith Alan Carson, Jr., Hopkinton, MA (US); Venkata R. Tiruveedi, Franklin, MA (US); Padma Krishnamoorthy, Shrewsbury, MA (US); Min Yin, Bolton, MA (US)

(73) Assignee: EMC Corporation, Hopkinton, MA (US)

( * ) Notice: Subject to any disclaimer, the term of this patent is extended or adjusted under 35 U.S.C. 154(b) by 321 days.

(21) Appl. No.: 11/772,805

(22) Filed: Jul. 2, 2007

(51) Int. Cl.
*G06F 17/30* (2006.01)
(52) U.S. Cl. .................. 707/640; 707/609; 707/659
(58) Field of Classification Search ............... 707/609, 707/640, 659
See application file for complete search history.

(56) References Cited

U.S. PATENT DOCUMENTS 7,080,371 B1 * 7/2006 Arnaiz et al. ............... 717/170
2004/0205401 A1 * 10/2004 Froehlich et al. ............. 714/28
2004/0260658 A1 * 12/2004 Dettinger et al. ............ 705/400
2008/0276234 A1 * 11/2008 Taylor et al. ................ 717/177

* cited by examiner

*Primary Examiner*—Isaac M Woo
*Assistant Examiner*—Johnese Johnson
(74) *Attorney, Agent, or Firm*—Chapin IP Law, LLC

(57) ABSTRACT

Upgrading an original repository of data is disclosed. A repository is defined by a set of schema structures and data contained therein. A copy of the original repository is exported. The set of schema structures of the original repository is modified to create a set of schema structures of the upgraded repository. Schema structures that are not present after the upgrade are deleted after data migration is completed. Data is migrated to the set of schema structures of the upgraded repository. Data includes existing data from the original repository and seed data for the upgraded repository. Existing data is copied into the appropriate schema structures of the upgraded repository. Seed data is inserted into new schema structures of the upgraded repository. The set of schema structures of the upgraded repository are validated against a standard set of schema structures corresponding to a properly upgraded standard repository to detect any errors.

20 Claims, 8 Drawing Sheets

301 EXPORT A COPY OF THE ORIGINAL REPOSITORY OF DATA, WHEREIN A REPOSITORY IS DEFINED BY A SET OF SCHEMA STRUCTURES AND DATA CONTAINED THEREIN

302 MODIFY THE SET OF SCHEMA STRUCTURES OF THE ORIGINAL REPOSITORY TO CREATE A SET OF SCHEMA STRUCTURES OF THE UPGRADED REPOSITORY, WHEREIN SCHEMA STRUCTURES NOT PRESENT AFTER THE UPGRADING PROCESS IS COMPLETE ARE NOT DELETED UNTIL MIGRATION OF DATA IS COMPLETED

305 ADD A NEW SCHEMA STRUCTURE TO THE SET OF SCHEMA STRUCTURES OF THE ORIGINAL REPOSITORY

308 CHANGE AN EXISTING SCHEMA STRUCTURE OF THE ORIGINAL REPOSITORY

303 MIGRATE DATA TO THE SET OF SCHEMA STRUCTURES OF THE UPGRADED REPOSITORY, WHEREIN DATA INCLUDES EXISTING DATA FROM THE ORIGINAL REPOSITORY AND SEED DATA FOR THE UPGRADED REPOSITORY, WHEREIN EXISTING DATA IS COPIED INTO THE APPROPRIATE SCHEMA STRUCTURES OF THE UPGRADED REPOSITORY AND SEED DATA IS INSERTED INTO NEW SCHEMA STRUCTURES OF THE UPGRADED REPOSITORY

306 MOVE DATA FROM AN EXISTING SCHEMA STRUCTURE OF THE ORIGINAL REPOSITORY TO THE ADDED NEW SCHEMA STRUCTURE

307 DELETE THE EXISTING SCHEMA STRUCTURE

309 ADD SEED DATA TO THE CHANGED SCHEMA STRUCTURE, WHEREIN THE CHANGED SCHEMA STRUCTURE ALSO INCLUDES EXISTING DATA

304 VALIDATE THE SET OF SCHEMA STRUCTURES OF THE UPGRADED REPOSITORY AGAINST A STANDARD SET OF SCHEMA STRUCTURES CORRESPONDING TO A PROPERLY UPGRADED STANDARD REPOSITORY TO DETECT ANY ERRORS

FIG. 3

601 EXPORT A COPY OF THE ORIGINAL REPOSITORY OF DATA, WHEREIN A REPOSITORY IS DEFINED BY A SET OF SCHEMA STRUCTURES AND DATA CONTAINED THEREIN

602 MODIFY THE SET OF SCHEMA STRUCTURES OF THE ORIGINAL REPOSITORY TO CREATE A SET OF SCHEMA STRUCTURES OF THE UPGRADED REPOSITORY, WHEREIN SCHEMA STRUCTURES NOT PRESENT AFTER THE UPGRADING PROCESS IS COMPLETE ARE NOT DELETED UNTIL MIGRATION OF DATA IS COMPLETED

603 MIGRATE DATA TO THE SET OF SCHEMA STRUCTURES OF THE UPGRADED REPOSITORY, WHEREIN DATA INCLUDES EXISTING DATA FROM THE ORIGINAL REPOSITORY AND SEED DATA FOR THE UPGRADED REPOSITORY, WHEREIN EXISTING DATA IS COPIED INTO THE APPROPRIATE SCHEMA STRUCTURES OF THE UPGRADED REPOSITORY AND SEED DATA IS INSERTED INTO NEW SCHEMA STRUCTURES OF THE UPGRADED REPOSITORY

604 VALIDATE THE SET OF SCHEMA STRUCTURES OF THE UPGRADED REPOSITORY AGAINST A STANDARD SET OF SCHEMA STRUCTURES CORRESPONDING TO A PROPERLY UPGRADED STANDARD REPOSITORY TO DETECT ANY ERRORS

605 EXPORT THE UPGRADED REPOSITORY PRIOR TO MAKING ANY FURTHER CHANGES TO THE UPGRADED REPOSITORY

FIG. 6

DATA REPOSITORY UPGRADE PROCESS

CROSS-REFERENCE TO RELATED APPLICATION

This application relates to the following application, filed on the same date as the present application, entitled "AUTOREP PROCESS TO CREATE PRE-LOADED REPOSITORY AND UPGRADE SCRIPT", and otherwise identified by U.S. application Ser. No. 11/770,216. The teachings and disclosure of this filed application are each incorporated by reference herein in their entirety.

BACKGROUND

The rapid expansion of information service and data processing industries has resulted in a need for computer systems to manage and store large amounts of data. As an example, financial service industry businesses such as banks, mutual fund companies or the like often operate large and complex data processing systems that require access to many hundreds of gigabytes or even terabytes of data. Data storage system developers have responded to these types of data storage requirements by integrating large capacity data storage systems, data communications devices and computer systems into networks called "storage networks" or "storage area networks" (SANs.) A storage area network is a collection of data storage systems that are networked with a number of host computer systems that operate as servers to access data stored in the data storage systems.

Elements of a typical conventional storage area network implementation include one or more connectivity devices such as high speed data switches or routers that interconnect the various data storage systems to each other and to one or more host or server computer systems (servers) that require access to (e.g., read and/or write) the data in the data storage systems on behalf of client software applications and/or client computer systems.

A developer or administrator of such a storage area network environment may install one or more distributed storage area network management software applications within the storage area network to manage or administer the various elements (i.e., switches, computer systems, storage systems, etc.) that operate within the storage area network. A network manager (i.e., a user) responsible for management of the storage area network operates the network management software application to perform management tasks such as performance monitoring, network analysis and remote configuration and administration of the various components operating within the storage area network.

A typical conventional storage area network management software application may have several different software components that execute independently of each other on different computer systems but that collectively interoperate together to perform network management. As an example, conventional designs of storage area network management applications may include console, server, agent and storage software components.

Generally, the server component operates as a central control process within the storage area network management application and coordinates communication between the console, storage and agent components. The console component often executes within a dedicated storage area network management workstation to allow the network administrator to visualize and remotely control and manage the various elements within the storage area network that are graphically represented within the console. Certain console applications include Graphical User Interface (GUI) software programs that enable network managers to graphically manage, control and configure various types of hardware and software resources or managed entities associated with a corresponding managed network. In one conventional storage area network management application, rendering the graphical user interface enables the network manager to graphically select, interact with, and manage local or remote devices and associated software processes operating in the network. More specifically, based on use of the graphical user interface in combination with an input device such as a hand operated keyboard and/or mouse and corresponding pointer displayed on a viewing screen, a network manager is able to manage hardware and software entities such as storage devices, peripherals, network data communications devices, and so forth associated with the network. Typically, in such network management applications, a network manager may select a displayed icon representing a corresponding resource in the storage area network and apply a management command in order to display corresponding management information.

Enterprise Storage Networks are large and complex environments that include various elements such as storage arrays, switches, hosts and databases all inter-networked. These elements occur in several hundreds in such environments. These elements in turn may consist of several hundred thousands of manageable elements such as storage devices, storage arrays, and switch ports, database instances, host devices and file systems, and the like. Management of such environments is a daunting task and typically requires Storage Resource Management solutions such as EMC's Control Center (ECC) family of products, available from EMC Corporation of Hopkinton, Mass. ECC includes agents that are deployed on storage elements for the purpose of gathering data about these elements, components that process and persist data, applications that use persisted information to enable the management of these environments. ECC identifies the entire process of retrieving the collected data from agents to data persistence as a transaction. In order to operate, applications such as ECC require storage area network data to be stored in such a way that the data is easily accessed and updated as the storage area network and/or its configuration change over time. Typically, storage area network data used by ECC is stored in a repository such as a database, with database structures that are particularly configured for storing storage area network data.

SUMMARY

As applications such as ECC change over time, to include more features as well as improvements of existing features, the repositories used by these applications may also need to change. The repository may need new structures to hold new types of data that were not previously gathered. The repository may also need new structures that better organize already existing data. Further, the repository may no longer need other structures that hold data types that will become unneeded or obsolete with regards to a new version of an application. Instead of creating an entirely new repository from scratch, typically a repository is upgraded to reflect changes that have been made in its structure.

Conventional technologies for upgrading repositories typically use two repositories (i.e., two separate databases). An existing repository, with a particular identifier (i.e., name) is stored on a first host, and the new repository (i.e., the upgraded version of the existing repository) is installed on a separate new host with its own particular identifier (i.e., name). The installation of the upgraded repository is a clean install, that is, it includes no information and has only the structures that will be populated with information. The upgraded version may include seed data (i.e., initial placeholder data) for some structures in the upgraded repository, but will otherwise lack any data stored within the existing repository. The data in the existing repository is then copied over to the upgraded repository, and the upgraded repository is tested for errors. If no errors are found, either in the structures of the upgraded repository or in the copied data from the existing repository, the identifier of the upgraded repository is changed to that of the existing repository. The upgraded repository is then copied to the host that includes the original existing repository, thereby replacing it. Performing a repository upgrade in this manner requires a great deal of processing overhead and other resources, as well as two separate hosts that are each capable of storing the entirety of the repository and its data, and transmitting the data back and forth. The upgrade process may also take a lot of time to perform, if there is a large amount of data that must be copied twice, once to the upgraded repository on its host, and then back to replace the original repository on its host, resulting in an inefficient process as well.

Embodiments disclosed below significantly overcome these and other issues by providing for an upgrade process that takes place on the existing repository, without requiring two separate hosts and the back-and-forth copying of the same data. A repository upgrade program includes a number of scripts that perform the upgrade on that repository. Each script includes a number of structured query language (SQL) statements that, when taken in total, provide the functionality needed for each step in the upgrade process. The "upgradability" of the existing repository is checked; for example, if the current version of the repository is 3.0, it is not possible to upgrade directly to version 6.0. The intervening upgrades (for example, from version 3.0 to version 4.0, from version 4.0 to version 4.1, from version 4.1 to version 4.2, from version 4.2 to version 5.0, and from version 5.0 to version 5.1) must all first be performed. If the existing repository is of the proper version, then it is upgradeable. A copy of the existing repository is then made, and exported to be saved in case it is needed later. If the repository (i.e., database) software itself needs to be upgraded, that is done before the repository version is upgraded. Next, the schemas of the repository are upgraded to the desired new version. The schemas are the structures of the repository, such as but not limited to tables, columns, database procedures, and the like. Then, existing data is migrated to the upgraded schemas, where appropriate, and seed data is added to new and/or existing schemas, again where appropriate. The upgraded repository is then validated, to make sure there are no errors in either the data or the schemas; i.e., validation checks to make sure that the upgrade was performed properly. Finally, a copy of the upgraded repository is exported for troubleshooting purposes. The upgrade scripts are executed in a particular order, according to, for example, a specification file, to aid in determining where errors may occur during the upgrading procedure. This allows the exact location of an error to be determined, and the upgrade process may be fixed at the point of failure, and then resumed without having to start the entire process over again. In this way, an existing repository may be upgraded to a new version, while maintaining all necessary current data, without having to perform the inefficient steps that are typical of conventional repository upgrading technologies.

More particularly, in an embodiment there is provided a method of upgrading an original repository of data. A repository is defined by a set of schema structures and the data contained therein. The method includes exporting a copy of the original repository, and modifying the set of schema structures of the original repository to create a set of schema structures of the upgraded repository. Schema structures that are not present after the upgrading process is complete are not deleted until migration of data is completed. The method also includes migrating data to the set of schema structures of the upgraded repository. The migrated data includes existing data from the original repository and seed data for the upgraded repository. Existing data is copied into the appropriate schema structures of the upgraded repository and seed data is inserted into new schema structures of the upgraded repository. The method finally includes validating the set of schema structures of the upgraded repository against a standard set of schema structures corresponding to a properly upgraded standard repository to detect any errors that may have occurred during the upgrading process.

In a related embodiment, modifying may include adding a new schema structure to the set of schema structures of the original repository. Further, migrating may include moving data from an existing schema structure of the original repository to the added new schema structure, and then deleting the existing schema structure. In another related embodiment, modifying may include changing an existing schema structure of the original repository, and migrating may include adding seed data to the changed schema structure, wherein the changed schema structure also includes existing data.

In yet another related embodiment, migrating may include migrating data to the set of schema structures of the upgraded repository, wherein data includes existing data from the original repository and seed data for the upgraded repository. The existing data may include customized data defined by a user. Existing data is copied into the appropriate schema structures of the upgraded repository and seed data is inserted into new schema structures of the upgraded repository. In yet still another related embodiment, migrating may further include, prior to migrating, taking the seed data from a temporary table that includes the seed data, and deleting the temporary table after migration of data is completed.

In still yet another related embodiment, the method may include comparing a version identifier of a desired upgrade to the original repository with a version identifier of the original repository. The method may also include determining that the version identifier of the desired upgrade correlates with the version identifier of the original repository so that the upgrading method may be performed. In a further related embodiment, determining may include determining that the version identifier of the desired upgrade does not correlate with the version identifier of the original repository. The method may then include providing upgrade information, wherein the upgrade information identifies any necessary upgrades to be made to the original repository before the original repository is able to be upgraded with the desired upgrade, and performing the upgrades identified in the upgrade information to the original repository.

In another related embodiment, the method may include exporting the upgraded repository prior to making any further changes to the upgraded repository. In still yet another related embodiment, exporting, modifying, migrating, and validating may be performed according to a set of instructions. The set of instructions may be ordered according to an execution sequence. Instructions may execute one at a time according to the execution sequence, and the method may include counting each successfully executed instruction to produce a result.

The method may also include detecting an error during the upgrading process, providing the result of the counting to identify exactly where in the execution sequence the error occurred.

In yet another related embodiment, the original repository may be a SAN repository of storage area network data that describes components and connections of a storage area network according to a set of schema structures that define the SAN repository. The method may then include exporting a copy of the SAN repository, and modifying the set of schema structures of the SAN repository to create a set of schema structures of the upgraded SAN repository. Schema structures that are not present after the upgrading process is complete may not be deleted until migration of data is completed. The method may also include migrating data to the set of schema structures of the upgraded SAN repository, wherein data includes existing data describing a storage area network from the current SAN repository and seed data for the upgraded SAN repository. Existing data may be copied into the appropriate schema structures of the upgraded SAN repository and seed data may be inserted into new schema structures of the upgraded SAN repository. The method may finally include validating the set of schema structures of the upgraded SAN repository against a standard set of schema structures corresponding to a properly upgraded standard SAN repository to detect any errors.

In another embodiment there is provided a computer system including a memory; a processor; a communications interface; and an interconnection mechanism coupling the memory, the processor and the communications interface, allowing communication there between. The memory is encoded with a repository upgrade application, that when executed in the processor, provides a repository upgrade process that upgrades an original repository of data. The repository upgrade process causes the computer system to perform operations of exporting a copy of the original repository and modifying the set of schema structures of the original repository to create a set of schema structures of the upgraded repository. Schema structures that are not present after the upgrading process is complete are not deleted until migration of data is completed. The repository upgrade process also causes the computer system to perform operations of migrating data to the set of schema structures of the upgraded repository, wherein data includes existing data from the original repository and seed data for the upgraded repository. Existing data is copied into the appropriate schema structures of the upgraded repository and seed data is inserted into new schema structures of the upgraded repository. The repository upgrade process finally causes the computer system to perform operations of validating the set of schema structures of the upgraded repository against a standard set of schema structures corresponding to a properly upgraded standard repository to detect any errors that may have occurred during the execution of the repository upgrade process.

In yet another embodiment there is provided a computer program product, stored on computer readable medium, to upgrade an original repository of data, wherein a repository is defined by a set of schema structures and data contained therein. The computer program product includes computer program code for exporting a copy of the original repository and computer program code for modifying the set of schema structures of the original repository to create a set of schema structures of the upgraded repository. Schema structures that are not present after the upgrading process is complete are not deleted until migration of data is completed. The computer program product also includes computer program code for migrating data to the set of schema structures of the upgraded repository, wherein data includes existing data from the original repository and seed data for the upgraded repository. Existing data is copied into the appropriate schema structures of the upgraded repository and seed data is inserted into new schema structures of the upgraded repository. The computer program product finally includes computer program code for validating the set of schema structures of the upgraded repository against a standard set of schema structures corresponding to a properly upgraded standard repository to detect any errors that may have occurred during the upgrading process.

It is to be understood that the system of the present application may be embodied solely as a software program, or as a software program operating in conjunction with corresponding hardware. For example, embodiments of the present application may be implemented in EMC's Control Center (ECC) software application that provides graphical management functionality of storage area network resources. Embodiments of the present application may also be implemented in computer devices that operate the Control Center (ECC) software. Control Center software is manufactured by EMC Corporation of Hopkinton, Mass., USA.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 3 illustrates a flowchart of a procedure performed by the system of FIG. 1 when upgrading a repository of data by adding new schema structures and changing existing schema structures.

FIG. 6 illustrates a flowchart of a procedure performed by the system of FIG. 1 when exporting an upgraded repository prior to making any further changes to the repository.

DETAILED DESCRIPTION

Generally, disclosed embodiments include methods and apparatus that upgrade an original repository of data to an upgraded repository. The original repository is capable of being upgraded if the original repository is of the proper version. A copy of the existing repository is made, and exported for preservation purposes. If the repository (i.e., database) software itself needs to be upgraded, that upgrade is performed by any changes are made to the original repository. Next, the schemas of the repository are upgraded to the desired new version. The schemas are the structures of the repository, such as but not limited to tables, columns, database objects, and the like. Then, existing data is migrated to the upgraded schemas, where appropriate, and seed data is added to new and/or existing schemas, again where appropriate. The upgraded repository is then validated, to make sure there are no errors in either the data or the schemas; i.e., validation checks to make sure that the upgrade was performed properly. A copy of the upgraded repository may be exported for troubleshooting purposes.

Figure 1:
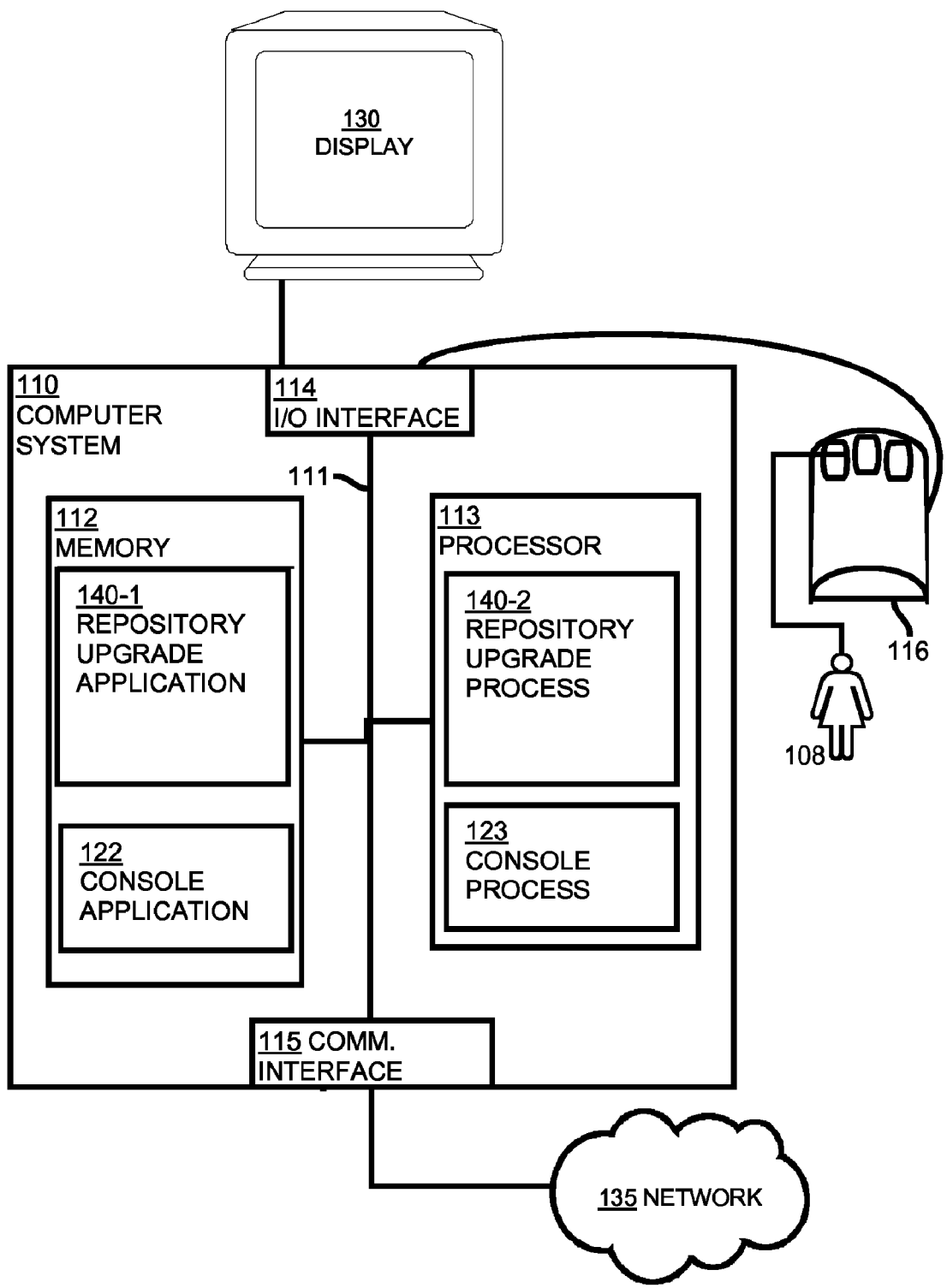
FIG. 1 shows a high-level block diagram of a computer system according to one embodiment disclosed herein.

More particularly, FIG. 1 is a block diagram illustrating example architecture of a computer system 110 that executes, runs, interprets, operates or otherwise performs a repository upgrade application 140-1 and a repository upgrade process 140-2 suitable for use in explaining example configurations disclosed herein. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a keyboard, mouse, touchpad, trackball, etc.) couples to the processor 113 through the I/O interface 114 and enables a user 108 such as a system administrator of a storage area network (SAN) to provide input commands and generally administer the SAN through the graphical user interface (not shown) that is provided on a display 130. The communications interface 115 enables the computer system 110 to communicate with other devices (e.g., components of the SAN) on a network 135.

The memory system 112 is any type of computer readable medium and in this example is encoded with a repository upgrade application 140-1 that includes repository upgrade process 140-2. The memory system 112 also includes a cache 120, referred to throughout as a second cache 120. The memory system 112 may further include a first cache 126, or the first cache 126 may be located in a separate memory unit 127 that the computer system 110 communications with via the communications interface 115, as shown in FIG. 1. The repository upgrade application 140-1 may be embodied as software code such as data and/or logic instructions (e.g., code stored in the memory system 112 or on another computer readable medium such as a removable disk) that supports processing functionality according to different embodiments described herein. A console application 122 may also be embodied as software code in the memory system 112. During operation of the computer system 110, the processor 113 accesses the memory system 112 via the interconnection mechanism 111 in order to launch, run, execute, interpret or otherwise perform the logic instructions of the repository upgrade application 140-1 as well as the console application 122. Execution of the repository upgrade application 140-1 in this manner produces processing functionality in a repository upgrade process 140-2. Similarly, execution of the console application 122 produces processing functionality in a console process 123. In other words, the repository upgrade process 140-2 represents one or more portions or runtime instances of the repository upgrade application 140-1 performing or executing within or upon the processor 113 in the computer system 110 at runtime.

It is noted that example configurations disclosed herein include the repository upgrade application 140-1 itself including the repository upgrade process 140-2 (i.e., in the form of un-executed or non-performing logic instructions and/or data). The repository upgrade application 140-1 may be stored on a computer readable medium (such as a floppy disk), hard disk, electronic, magnetic, optical or other computer readable medium. The repository upgrade application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the repository upgrade application 140-1 in the processor 113 as the repository upgrade process 140-2. Those skilled in the art will understand that the computer system 110 may include other processes and/or software and hardware components, such as an operating system not shown in this example.

A number of flowcharts of the presently disclosed invention are illustrated in FIGS. 2-8. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flowcharts do not depict the syntax of any particular programming language. Rather, the flowcharts illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order. More specifically, FIGS. 2-8 illustrate flowcharts of various procedures performed by the system of FIG. 1 to upgrade a repository of data, as described in embodiments below.

A repository of data may be defined by a set of schema structures and data contained therein. From time to time, a repository may need to be upgraded to a newer version. For example, an application that interfaces with the repository and uses the data stored therein may itself have been upgraded to a newer version. The newer version of the interfacing application may require data that is not currently stored in the repository, or is not organized within the repository in such a way that the interfacing application is able to make use of it. An upgrade to a repository need not be related to an upgrade of an application that makes use of the data stored in the repository, however. The repository itself may simply need to be upgraded to improve or otherwise change its storage structure, the types of data stored therein, how those data are stored, etc.

Whatever the reason for upgrading a repository, such an upgraded may be initialized in a number of ways. For example, a user, such as the user 108 shown in FIG. 1, may initiate the upgrade by interacting with the computer system 110 through the input device 116. Through manipulation of the input device 116, the user 108 may cause the computer system 110 to execute the repository upgrade application 140-1, stored in the memory system 112, as the repository upgrade process 140-2, which will begin upgrading a repository, as is explained in greater detail below. Alternatively, the execution of the repository upgrade application 140-1 as the repository upgrade process 140-2 may be triggered through an automatic action, such as a scheduled task of the computer system 110, or may be triggered by the receipt of a signal at the computer system 110. Those of ordinary skill in the art will appreciate that an upgrade may be initialized in any number of ways other than those mentioned above, and that the descriptions given above are provided as examples, and therefore are not limiting on how an upgrade to a repository may be initialized.

Figure 2:
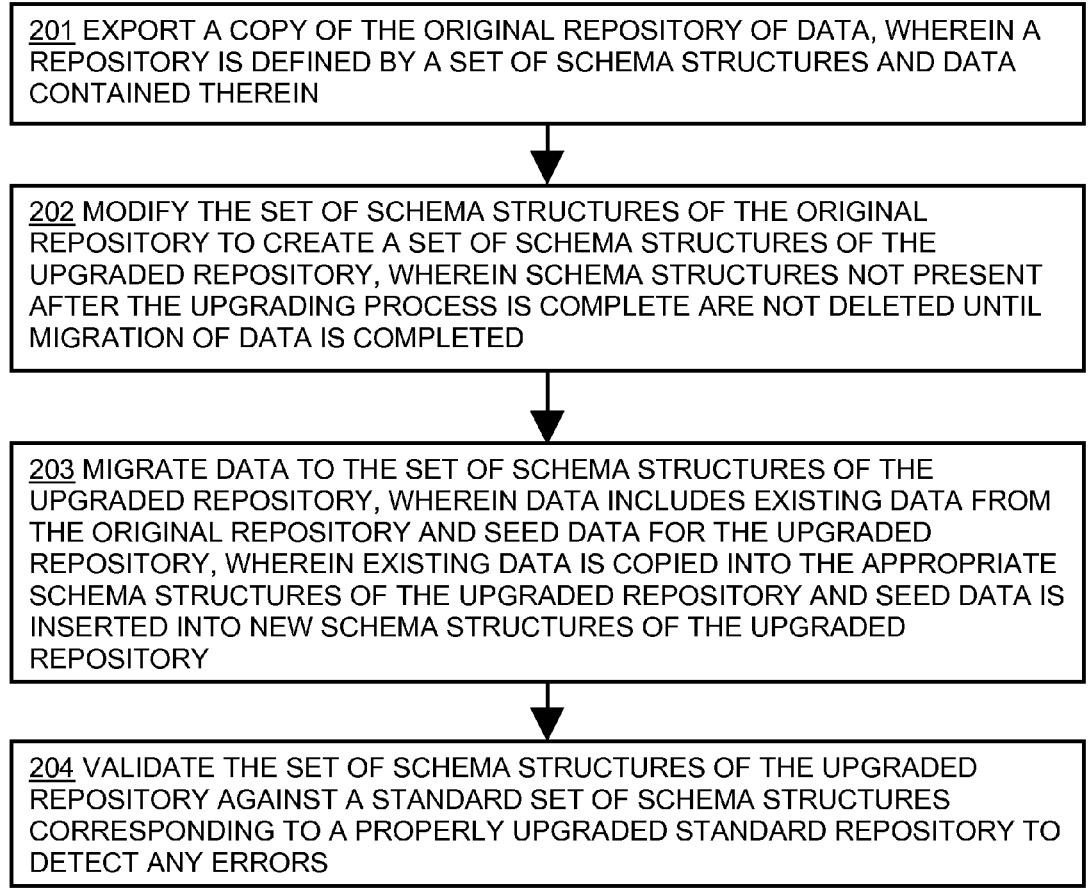
FIG. 2 illustrates a flowchart of a procedure performed by the system of FIG. 1 when upgrading a repository of data, the repository defined by a set of schema structures that includes the data.

In FIG. 2, when the repository upgrade application 140-1 executes as the repository upgrade process 140-2, the repository upgrade process 140-2 will first export a copy of the original repository, step 201. By preserving a copy of the current (i.e., the original pre-upgrade repository) repository, the repository upgrade process 140-2 allows the entirety, or any portion, of the original repository to be restored at any time. For example, if one or more errors occur during execution of the repository upgrade process 140-2, such as a loss of customized data present in the original repository, having an original copy of the pre-upgrade original repository makes it possible to retrieve that customized data and enter it into the upgraded repository. In a more extreme example, if the upgraded repository ever needed to be rolled back for some reason, such as a change to an older version of an application that interfaces with the repository, having a copy of the original repository allows such a rollback to occur.

With a copy of the original repository safely exported, the repository upgrade process 140-2 then modifies the set of schema structures of the original repository to create a set of schema structures of the upgraded repository, step 202. During this modification, some schema structures may need to be removed, as these structures may not be present in the upgraded repository. For example, a table within the original repository stores a particular type of data. If the upgraded repository does not include that table, the table must be removed in order for the schema of the upgraded repository to be created. The repository upgrade process 140-2 will not remove or otherwise delete such a table until any migration of data from the table is completed. This applies to every schema structure of the original repository that must be removed in order to create the schema of the upgraded repository. In contrast, as will be explained in greater detail below, new schemas that are to be added to the schema of the original repository are created as this time. Schemas that are modified between the original repository and the upgraded repository are also modified at this time. This allows data to be migrated to such new and/or modified schema structures. In one embodiment, the repository upgrade process 140-2 modifies the set of schema structures be executing a generated set of structured query language (SQL) scripts. These SQL scripts change the structure of the schemas, by adding, modifying, or removing database objects, as describe above. The SQL scripts are applied so the structure of the current (i.e., older) repository may be changed to match the structure of the upgraded (i.e., new) repository.

The repository upgrade process 140-2 next migrates data to the set of schema structures of the upgraded repository, step 203. The migrated data includes existing data from the original repository. This existing data is copied into the appropriate schema structures of the upgraded repository. For example, the upgraded repository may include a table with a new column, where the new column was not present in the original repository. The data that belongs in that new column was stored, in the original repository, in an existing column of another table. However, this table is not present in the upgraded repository, and thus needs to be removed. So, the repository upgrade process 140-2 first adds the new column, as described above with regards to step 202, and then migrates the data for this new column into the new column. Then, the repository upgrade process 140-2 may delete the table that included the column where the data was stored in the original repository. This explains why schemas that will not be present in the upgraded repository are not deleted until after the repository upgrade process 140-2 migrates data into the set of schema structures of the upgraded repository. The repository upgrade process 140-2 performs the upgrade of the original repository on top of the original repository, and thus the data existing within the original repository has to have a location in the repository at all times during the upgrade. After the repository upgrade process 140-2 has migrated the existing data of the original repository to where that data belongs in the upgraded schemas of the upgraded repository, then schema structures that will not be in the upgraded repository may be deleted, without any loss of data or the need to move the data to another storage device or entity, and then copy it back to the upgraded repository. This also allows customized data from the original repository to be preserved in the upgraded repository.

The data migrated by the repository upgrade process 140-2 also includes seed data. Seed data is the initial data for certain types of schema structures. For example, when the repository upgrade process 140-2 creates entirely new schemas for the upgraded repository, that were not present in the original repository, these schemas may need to include initial data. If the types of data for these new schemas are not located in the original repository, the data must come from somewhere else. This is an example of a situation where seed data may be need. The seed data may be actual data, taken from another repository that corresponds to the upgraded repository, and thus includes the necessary types of data. Alternatively, the seed data may be dummy data, that is, placeholder values that are the proper types of data, but have no real meaning and will be replaced after the repository has been upgraded by actual data. The repository upgrade process 140-2 thus inserts the seed data into the appropriate new schema structures of the upgraded repository. The repository upgrade process 140-2 may also insert seed data into previously existing schema structures from the original repository, where the repository upgrade process 140-2 has modified such structures to include, for example, new columns or rows not previously present. The repository upgrade process 140-2 may also, or alternatively, update existing seed data, or delete or otherwise remove existing seed data as well.

In one embodiment, the repository upgrade process 140-2 applies a number of SQL scripts to migrate the data. These SQL scripts contain generic logic to migrate a set of tables that contain seed data and also specific logic to migrate other data according to application needs, as described above.

Finally, the repository upgrade process 140-2 validates the set of schema structures of the upgraded repository against a standard set of schema structures corresponding to a properly upgraded standard repository, step 204. A standard repository may be, for example, a repository that is the same version as the upgraded repository, but instead of being created by upgrading an original repository, is created through a full clean install. The schemas of such a clean install of the repository are themselves validated, and after that validation is successful, the schemas may be used by the repository upgrade process 140-2 for validation purposes of an upgrade.

The repository upgrade process 140-2 performs this validation to detect any errors that may have occurred during the upgrade that were not otherwise detected by the repository upgrade process 140-2, for example according to the error detection scheme described below in regards to FIG. 7. For example, a table in the upgraded repository may contain a new row that was not present in the original repository. During execution, the repository upgrade process 140-2 may have created that new row, and added it to the table, but at the conclusion of the upgrade, the table may not include that row due to, for example, data corruption within the repository. By validating all of the upgraded schemas against a standard set of proper schemas, the repository upgrade process 140-2 will detect that this particular table does not include the new row.

In one embodiment, the repository upgrade process 140-2 executes a set of SQL scripts to compare the schemas of the upgraded repository to schemas of a same version of the upgraded repository that was directly installed, instead of upgraded from an earlier version. Any discrepancies, such as the missing new row in a table in the example given above, found by the repository upgrade process 140-2 in database object structures are reported. Discrepancies may be reported to a user 108 (shown in FIG. 1) in any number of ways, such as but not limited to through a communications medium, such as an e-mail or a telephone message, or a visible or audible type of alert, either at the computer system 110 itself or to a different computer system at another location where the user is located.

FIG. 3 shows in greater detail how the repository upgrade process 140-2 adds new schema structures and changes existing schema structures when upgrading the original repository. After exporting a copy of the original repository, step 301, the repository upgrade process 140-2 modifies the set of schema structures of the original repository to create a set of schema structures of the upgraded repository, step 302. As explained above, the repository upgrade process 140-2 does not delete any schema structures until after the repository upgrade process 140-2 has completed data migration. When the schema structures have been modified, the repository upgrade process 140-2 then migrates data to the set of schema structures of the upgraded repository, step 303. The migrated data includes existing data from the original repository. This existing data is copied into the appropriate schema structures of the upgraded repository. The migrated data also includes seed data, which is the initial data for certain types of schema structures. The repository upgrade process 140-2 thus inserts the seed data into the appropriate new schema structures of the upgraded repository.

There are three changes that the repository upgrade process 140-2 may make to schema structures. The repository upgrade process 140-2 may add one or more new schema structures that were not present in the original repository. The repository upgrade process 140-2 may change or otherwise modify one or more schema structures that existed within the original repository. Finally, the repository upgrade process 140-2 may delete or otherwise remove one or more schema structures that existed within the original repository, but only after data migration is complete.

When the repository upgrade process 140-2 adds a new schema structure to the set of schema structures of the original repository, step 305, the repository upgrade process 140-2 may take any of the following steps in terms of data migration. The repository upgrade process 140-2 may place entirely new data (i.e., seed data) in the new schema structure; such data was not present in the original repository. The repository upgrade process 140-2 may place entirely new data (i.e., seed data) in the new schema structure, and move existing data from an existing schema structure of the original repository to the added new schema structure. Alternatively, the repository upgrade process 140-2 may simply move existing data from an existing schema structure of the original repository to the added new schema structure, step 306. Note that, when the repository upgrade process 140-2 moves data, the repository upgrade process 140-2 may either perform a copy-type operation, where the data remains in its original location and is also found in the new schema structure, or may be a cut-type operation, where the data does not remain in its original location and may only be found in the new schema structure. If the original location (i.e., schema structure) of the existing data is not present in the upgraded repository, then after the data migration is completed, the repository upgrade process 140-2 deleting the existing schema structure, step 307.

When the repository upgrade process 140-2 changes an existing schema structure of the original repository, step 308, the repository upgrade process 140-2 may take any of the above-described steps in terms of data migration. That is, the repository upgrade process 140-2 may place entirely new data (i.e., seed data) in the changed schema structure; such data was not present in the original repository. Alternatively, the repository upgrade process 140-2 may simply move existing data from an existing schema structure of the original repository to the changed schema structure. Or, as another alternative, the repository upgrade process 140-2 may add entirely new data (i.e., seed data) to the changed schema structure, wherein the changed schema structure also includes existing data, step 309. As still another alternative, the repository upgrade process 140-2 may supplement existing data within the changed schema structure with other existing data from another schema structure by moving that other existing data to the changed schema structure. Finally, the repository upgrade process 140-2 may take no action with regards to data that was already present in the changed schema structure. As with the case of adding a new schema structure, moving data may either be a copy-type operation or a cut-type operation. Additionally, the repository upgrade process 140-2 may delete any schema structures that are not present in the upgraded repository after the data migration is completed.

Finally, the repository upgrade process 140-2 validates the set of schema structures of the upgraded repository against a standard set of schema structures corresponding to a properly upgraded standard repository, step 304, as described in greater detail with regards to FIG. 2 above (see corresponding step 204).

Figure 4:
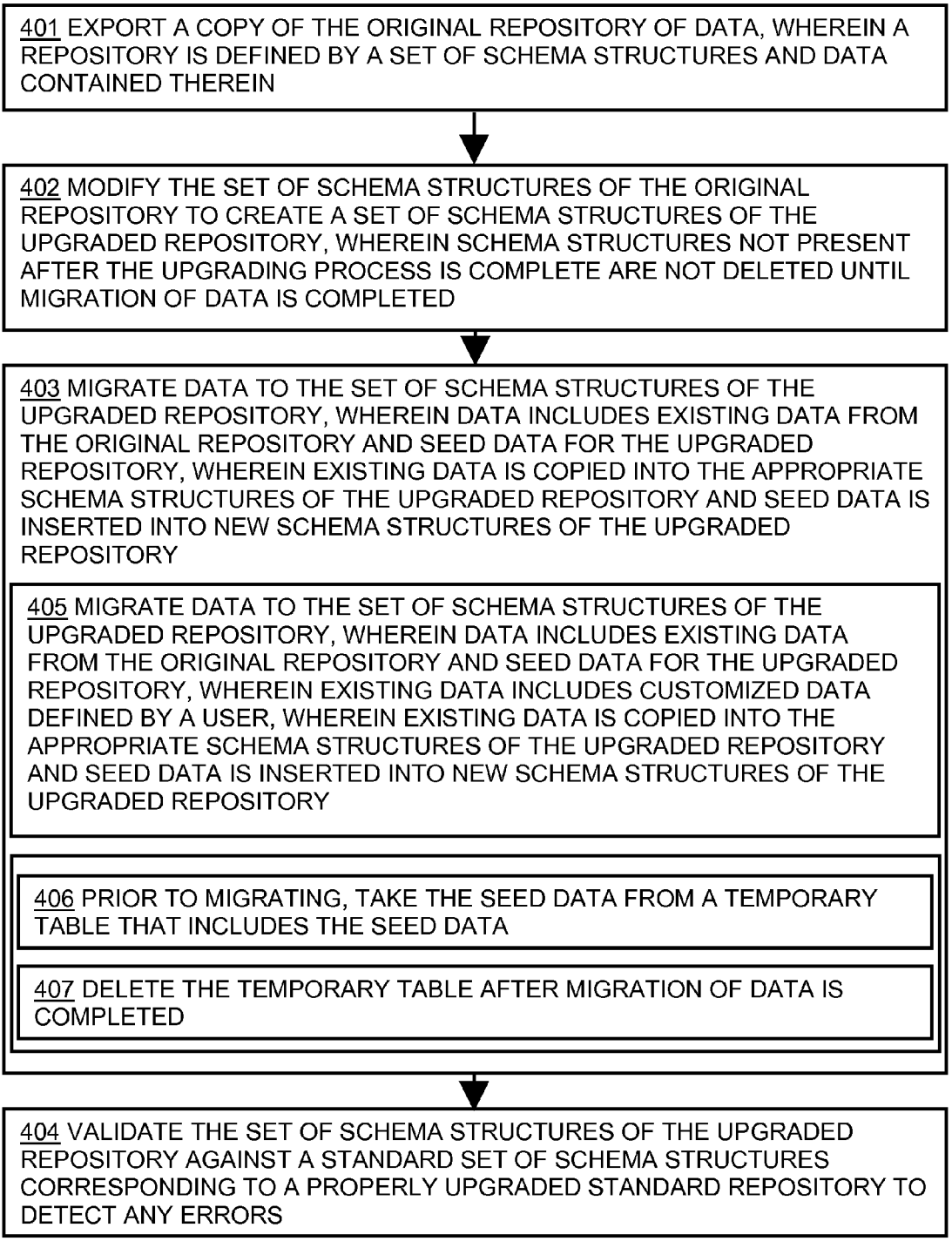
FIG. 4 illustrates a flowchart of a procedure performed by the system of FIG. 1 when upgrading a repository of data that includes existing data customized by a user and seed data to serve as initial data entries for certain new schema structures.

In FIG. 4, the repository upgrade process 140-2 upgrades a repository of data that includes existing data customized by a user and seed data to serve as initial data entries for certain new schema structures. The repository upgrade process 140-2 first exports a copy of the original repository, step 401. The entire original repository, or any portion, may then be restored at any time. The repository upgrade process 140-2 next modifies the set of schema structures of the original repository to create a set of schema structures of the upgraded repository, step 402. As is explained in greater detail above with regards to FIGS. 2 and 3, the repository upgrade process 140-2 will not remove or otherwise delete such any schema structures from the original depository until the repository upgrade process 140-2 finishes migrating data to the schema structures of the upgraded repository.

Next, the repository upgrade process 140-2 migrates data to the set of schema structures of the upgraded repository, step 403. The migrated data includes existing data from the original repository. This existing data also includes customized data defined by a user, step 405. Customized user data may take many forms, but it ultimately any data entered into, or otherwise stored within, the original repository that is customized according to the instructions received by the computer system 110 from a user 108 (both shown in FIG. 1). For example, the original repository may include data that defines when a user 108 should be alerted of an event. The user 108 may customize this alert (and thus the data that defines that alert) with regards to what type of an event triggers the particular alert, or how the particular alert is provided to the user. Such customized data may vary from repository to repository, depending on the users of a particular repository. The repository upgrade process 140-2 is designed to retain this customized data, to facilitate the upgrade process of the repository. Otherwise, if this customized data was not retained, users would have to re-create it each time an upgrade was completed. Such a process could be very time-consuming and frustrating for a user who had created a large amount of customized data in an original repository, prior to an upgrade.

As always, the existing data (including the customized data) is copied into the appropriate schema structures of the upgraded repository. The data migrated by the repository upgrade process 140-2 also includes seed data. Seed data is the initial data for certain types of schema structures. The repository upgrade process 140-2 may insert the seed data into the appropriate new schema structures of the upgraded repository. The repository upgrade process 140-2 may also insert seed data into previously existing schema structures from the original repository that the repository upgrade process 140-2 has modified during the upgrade process. The repository upgrade process 140-2 may, prior to migrating, take the seed data from a temporary table, step 406. The temporary table is a storage entity, accessible by the repository upgrade process 140-2, which contains the seed data. It may be a separate storage entity, such as but not limited to some type of optical storage medium (e.g., CD-ROM or DVD-ROM), or may be a storage location accessible by the repository upgrade process 140-2 via the communications interface 115 over a network 135 (shown in FIG. 1). Alternatively, the temporary table (or temporary tables, if need be), may be located within the storage device that also stores the repository, or may be created within the repository itself by the repository upgrade process 140-2, and the seed data then imported by the repository upgrade process 140-2 into the temporary table from another location, such as but not limited to those given above. As the seed data is, by definition, not present in the original repository, and as the upgrade process is performed on top of the original repository, the seed data must be located somewhere. The temporary table provides this location. After migration of data is complete, the repository upgrade process 140-2 deletes the temporary table, step 407. The upgrade concludes when the repository upgrade process 140-2 validates the set of schema structures of the upgraded repository against a standard set of schema structures corresponding to a properly upgraded standard repository, step 404.

Figure 5:
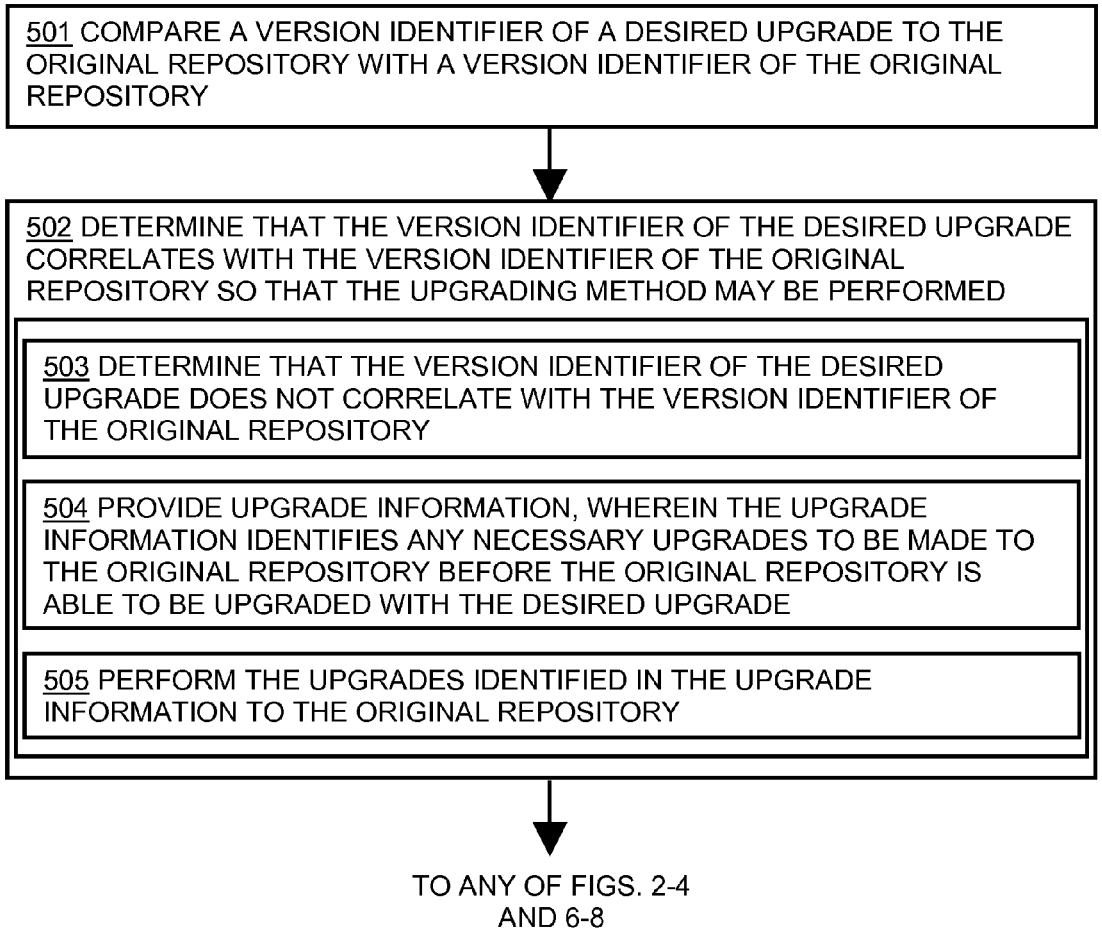
FIG. 5 illustrates a flowchart of a procedure performed by the system of FIG. 1 when determining if an upgrade of a repository may occur or if further upgrades must first be preformed.

FIG. 5 shows how the repository upgrade process 140-2, prior to beginning the upgrade process, determines if a repository may be upgraded, or if further upgrades must first be preformed. Each repository has a version identifier associated with that particular repository. The version identifier indicates the version of the repository. For example, a repository may have a version identifier of 5.2, meaning that the version of the repository is version 5.2. When an original repository is to be upgraded, the version of the original repository is important. Upgrades may typically only be performed on 'adjacent' versions. That is, the first version of a particular repository is typically version 1.0, and thus has a version identifier of 1.0. Each successive version is given its own version number (and thus its own version identifier). The versions typically increment in some type of sequence, and upgrades are typically only possible between adjacent versions. For example, if a repository has the following versions, according to sequential order of release, of 1.0, 1.1, 1.2, 2.0, 3.0, 3.1, 4.0, 5.0, 5.1, 5.2, and 6.0, a repository that is version 3.0 may be upgraded to version 3.1, but may not be upgraded to version 5.1. (Additionally, it should be noted that the reverse is true in terms of downgrades. A repository that is version 3.0 may be directly downgraded to version 2.0, but cannot be directly downgraded to version 1.1.) Upgrades corresponding to the intermediate versions, that is, to versions 3.1, 4.0, and 5.0, must first be performed.

Thus, prior to beginning the upgrade process, the repository upgrade process 140-2 first compares a version identifier of a desired upgrade to the original repository with a version identifier of the original repository, step 501. For example, if the desired upgrade is to version 6.0, the version identifier is 6.0. The repository upgrade process 140-2 compares this to the version identifier of the original repository. The original repository is version 5.2, and thus the version identifier of the original repository is 5.2. The repository upgrade process 140-2 then determines that the version identifier of the desired upgrade correlates with the version identifier of the original repository so that the upgrading method may be performed, step 502. As long as version 6.0 (the desired version of the upgraded repository) is adjacent (i.e., correlates) to version 5.2 (the version of the original repository), as adjacent is explained above, the repository upgrade process 140-2 may then perform the upgrading process. If the versions are not adjacent (i.e., the version identifiers do not correlate), the repository upgrade process 140-2 will determine this, step 503. For example, the version of the original repository may be 5.0, and the desired version of the upgraded repository may be 6.0. The repository upgrade process 140-2 will determine that 5.0 is not adjacent (i.e, does not correlate) with 6.0, because there are two intermediate upgrade versions in between: version 5.1 and version 5.2. In response, the repository upgrade process 140-2 provides upgrade information, step 504. The upgrade information identifies any necessary upgrades to be made to the original repository before the original repository is able to be upgraded with the desired upgrade. In this instance, the upgrade information will identify that the original repository (version 5.0) must first be upgraded to version 5.1, and that repository must then be upgraded to version 5.2, prior to the repository being upgraded to the desired version 6.0. The repository upgrade process 140-2 then performs the upgrades identified in the upgrade information to the original repository, step 505. That is, in the given example, the repository upgrade process 140-2 will execute the upgrade process (i.e., steps 201-204 of FIG. 2, as described in regards to FIG. 2) to upgrade the original repository (version 5.0) to version 5.1. The repository upgrade process 140-2 will then execute the upgrade process again, to upgrade the version 5.1 repository to the version 5.2 repository. At this point, the repository upgrade process 140-2 is able to execute the upgrade process again, this time to upgrade the version 5.2 repository (which will be considered the original repository with regards to the steps of FIG. 2) to the desired version 6.0 repository (i.e., the upgraded repository in regards to the steps of FIG. 2).

In FIG. 6, the repository upgrade process 140-2 exports an upgraded repository prior to making any further changes to the repository. The repository upgrade process 140-2 first performs the upgrade process on the repository; that is, the repository upgrade process 140-2 executes steps 601, 602, 603 and 604 (corresponding to steps 201-204 of FIG. 2, and described in greater detail with regards to FIG. 2). After the repository upgrade process 140-2 has validated the upgraded repository, step 604, the repository upgrade process 140-2 exports the upgraded repository prior to making any further changes to the upgraded repository, step 605. The repository upgrade process 140-2 exports a copy of the full repository so that users have the content of the upgraded repository immediately after the upgrade is completed. This also serves as a way to troubleshoot any issues that might come up after upgrade. For example, if certain data is missing from the upgraded repository after the upgrade is complete, the copy of the original repository that is exported by the repository upgrade process 140-2 prior to the upgrade (i.e., step 601), may be compared to the exported copy of the upgraded repository to determine if the missing data might have been caused by the repository upgrade process 140-2.

Figure 7:
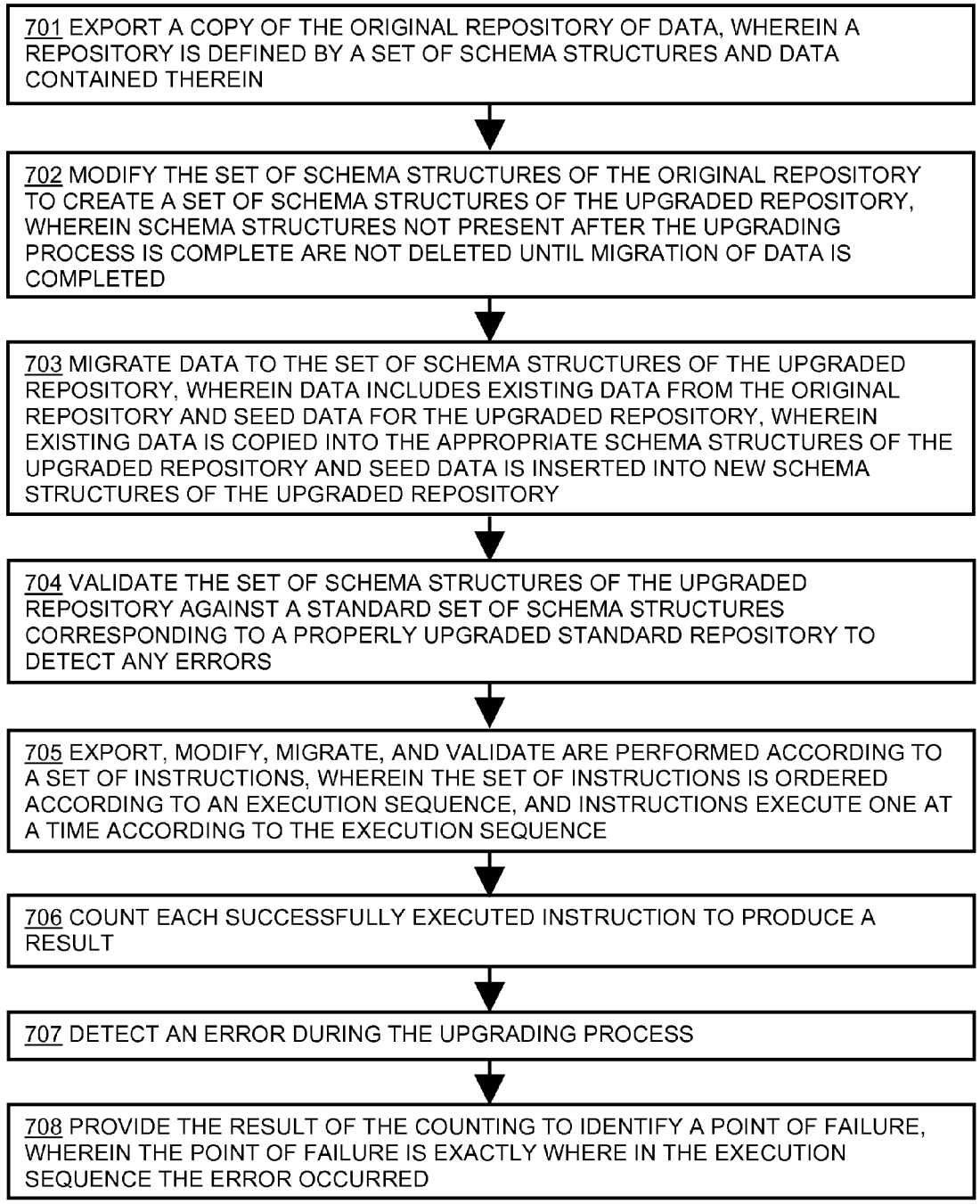
FIG. 7 illustrates a flowchart of a procedure performed by the system of FIG. 1 when tracking the instructions executed to upgrade a repository in order to determine exactly where any errors may occur during the upgrade process.

FIG. 7 shows how the repository upgrade process 140-2 tracks the instructions executed to upgrade a repository in order to determine exactly where any errors may occur during the upgrade process. The repository upgrade process 140-2 performs the basic upgrade process as shown and described in regards to FIG. 3. That is, the repository upgrade process 140-2 first exports a copy of the original repository, step 701, which allows the entirety, or any portion, of the original repository to be restored at any time. The repository upgrade process 140-2 modifies the set of schema structures of the original repository to create a set of schema structures of the upgraded repository, step 702. The repository upgrade process 140-2 will not remove or otherwise delete such any schema structures from the original depository until the repository upgrade process 140-2 finishes migrating data to the schema structures of the upgraded repository. Next, the repository upgrade process 140-2 migrates data to the set of schema structures of the upgraded repository, step 703. The migrated data includes existing data from the original repository. This existing data is copied into the appropriate schema structures of the upgraded repository. The data migrated by the repository upgrade process 140-2 also includes seed data. Seed data is the initial data for certain types of schema structures. The repository upgrade process 140-2 may insert the seed data into the appropriate new schema structures of the upgraded repository. The repository upgrade process 140-2 may also insert seed data into previously existing schema structures from the original repository that the repository upgrade process 140-2 has modified during the upgrade process. The repository upgrade process 140-2 may also insert seed data into previously existing schema structures from the original repository that also exist in the upgraded repository.

Finally, the repository upgrade process 140-2 validates the set of schema structures of the upgraded repository against a standard set of schema structures corresponding to a properly upgraded standard repository, step 704.

To determine where exactly in the process an error may occur, the repository upgrade process 140-2 performs the operations of exporting, modifying, migrating, and validating according to a set of instructions, step 705. For example, the set of instructions may be a set of SQL scripts. The set of instructions is ordered according to an execution sequence, and instructions execute one at a time according to the execution sequence. The execution sequence is any type of ordered list that arranges the instructions in a particular sequential order. For example, the SQL scripts may be numbered in a particular sequence, beginning with one and increasing in an equal increment for each successive SQL script. The repository upgrade process 140-2 accesses the execution sequence, and first performs the instruction that is first in the order. When the repository upgrade process 140-2 successfully completes (i.e., executes) that instruction, the repository upgrade process 140-2 performs the next instruction according to the sequence. The repository upgrade process 140-2 repeats this until every instruction has been successfully completed. During this procedure, the repository upgrade process 140-2 counts each successfully executed instruction to produce a result, step 706. The result may simply be the number of successfully executed instructions. For example, if the repository upgrade process 140-2 successfully completes (i.e., executes) five instructions according to the execution sequence, the result will be the number five. The repository upgrade process 140-2 may then detect an error during the upgrading process, step 707. In this example, the error is in the sixth instruction according to the execution sequence; this may be known as a point of failure. The error may occur for any of a number of reasons, which are outside the scope of this application. All that matters for purposes of the error tracking process of the repository upgrade process 140-2 is that an error did in fact occur. In response to the repository upgrade process 140-2 detecting an error, the repository upgrade process 140-2 provides the result of the counting to identify a point of failure, wherein the point of failure is exactly where in the execution sequence the error occurred, step 708. According to the example provided herein, the repository upgrade process 140-2 would provide the number five, indicating that the repository upgrade process 140-2 successfully executed five instructions prior to an error occurring. Thus, the error occurred during the sixth instruction according to the execution sequence, and this would be the point of failure. By providing this result to, for example, a user (such as the user 108 shown in FIG. 1), the repository upgrade process 140-2 allows the user to know exactly which instruction was executing when the error occurred, and thus the user (or another) is able to troubleshoot just that particular instruction, and not the entire upgrading process, which may include hundreds of separate instructions. Further, after the error has been corrected or otherwise repaired, the repository upgrade process 140-2 may resume the upgrading process from exactly the point of failure (i.e., the point during the process where the error occurred). The repository upgrade process 140-2 simply needs to store, or other access, the result of the counting and the execution sequence. In the example given above, prior to resuming the upgrading process, the repository upgrade process 140-2 would access the result, identify the last successfully executed instruction as the fifth instruction according to the execution sequence, and then resume the upgrade process with the next instruction according to the execution sequence. Here, that would be the sixth instruction. This error tracking process, and the re-start process, may be repeated throughout the upgrade process whenever the repository upgrade process 140-2 detects an error and then needs to re-start, until the upgrade process is itself complete.

Figure 8:
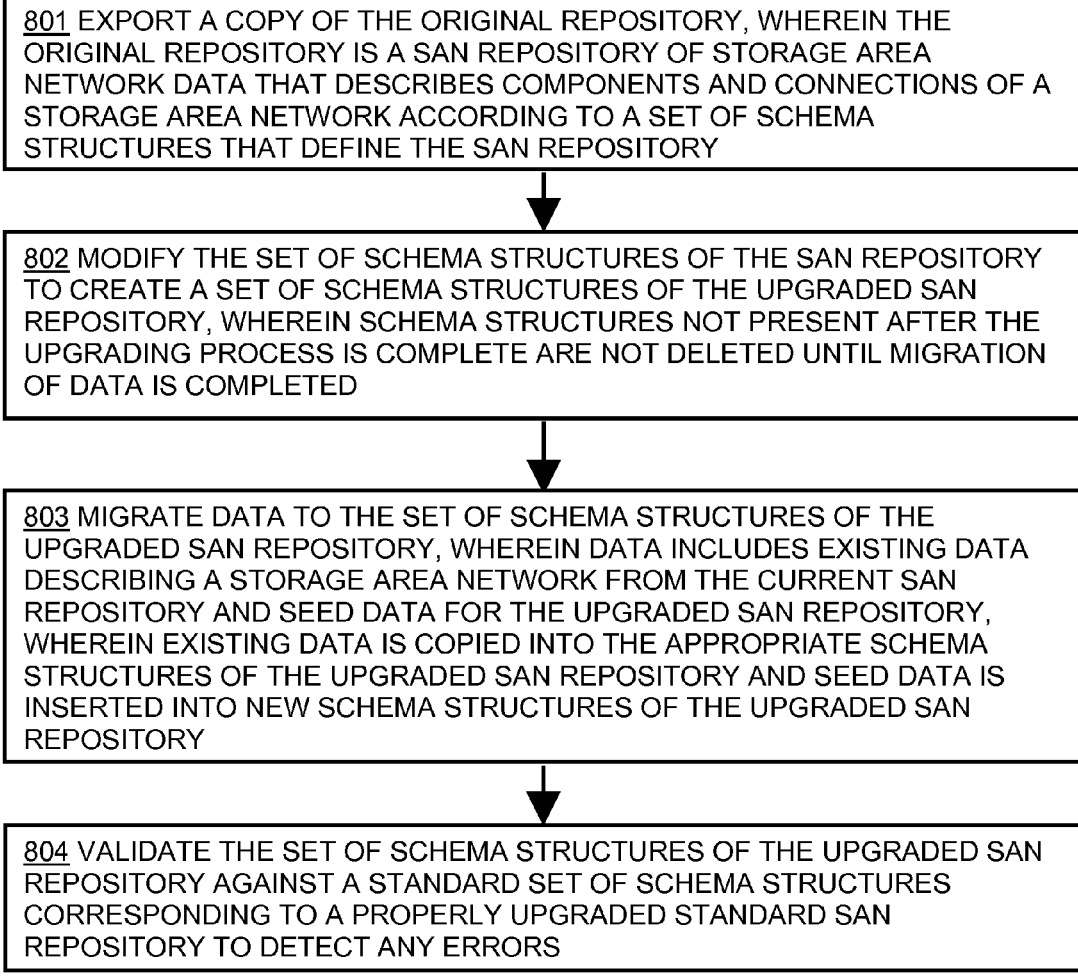
FIG. 8 illustrates a flowchart of a procedure performed by the system of FIG. 1 when upgrading a repository of storage area network data.

In FIG. 8, the repository upgrade process 140-2 upgrades a repository of storage area network data (i.e., a storage area network (SAN) repository). The storage area network data describes components and connections of a storage area network according to a set of schema structures that define the storage area network repository. For example, the repository may include data that describes hosts, arrays, storage devices, and the connections there between. The storage area network data is arranged in its own particular set of schema structures, which may be used and populated by a storage area network management application, such as ECC by EMC Corporation. The repository upgrade process 140-2 first exports a copy of the storage area network repository, step 801, so that the original storage area network repository and its data are available at a later time. The repository upgrade process 140-2 next modifies the set of schema structures of the storage area network repository to create a set of schema structures of the upgraded storage area network repository, step 802. As described above, the repository upgrade process 140-2 does not delete schema structures that are not present after the upgrading process is complete until the repository upgrade process 140-2 completes migrating data to the upgraded repository.

The repository upgrade process 140-2 then begins migrating data to the set of schema structures of the upgraded storage area network repository. The data that the repository upgrade process 140-2 migrates includes existing data describing a storage area network from the current storage area network repository. Existing data is copied into the appropriate schema structures of the upgraded storage area network repository. For example, the upgraded storage area network repository may include schema structures that hold user-created alerts that provide information to a storage area network administrator when, for example, storage arrays in the storage area network have a certain amount of storage space that is unused.

The data the repository upgrade process 140-2 migrates also includes seed data for the upgraded storage area network repository. Seed data is initial data for schema structures of the upgraded storage area network repository. For example, the upgraded storage area network repository may include a new table that stores the available bandwidth of connections between hosts and storage arrays. If the original repository did not include such data, the repository upgrade process 140-2 may use seed data to populate this table until actual data about available bandwidth is collected from the storage area network. Thus, the repository upgrade process 140-2 inserts the seed data into new schema structures of the upgraded storage area network repository as appropriate. Finally, the repository upgrade process 140-2 validates the set of schema structures of the upgraded storage area network repository against a standard set of schema structures corresponding to a properly upgraded standard storage area network repository to detect any errors, step 804.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method of upgrading an original storage area network (SAN) repository of data, wherein a SAN repository is defined by a set of schema structures and data contained therein, the method comprising:
exporting a copy of the original SAN repository;
modifying the set of schema structures of the original SAN repository to create a set of schema structures of the upgraded SAN repository, wherein schema structures not present after the upgrading process is complete are not deleted until migration of data is completed;
migrating data to the set of schema structures of the upgraded SAN repository, wherein data includes existing data from the original repository and seed data for the upgraded SAN repository, wherein existing data is copied into the appropriate schema structures of the upgraded SAN repository and seed data is inserted into new schema structures of the upgraded repository;
creating a standard SAN repository through a full clean install including upgrades; and
validating the set of schema structures of the upgraded SAN repository against a standard set of schema structures corresponding to the standard SAN repository to detect any errors.

2. The method of claim 1 wherein modifying comprises:
adding a new schema structure to the set of schema structures of the original repository;
and wherein migrating comprises:
moving data from an existing schema structure of the original repository to the added new schema structure; and
deleting the existing schema structure.

3. The method of claim 1 wherein modifying comprises:
changing an existing schema structure of the original repository;
and wherein migrating comprises:
adding seed data to the changed schema structure, wherein the changed schema structure also includes existing data.

4. The method of claim 1 wherein migrating comprises:
migrating data to the set of schema structures of the upgraded repository, wherein data includes existing data from the original repository and seed data for the upgraded repository, wherein existing data includes customized data defined by a user, wherein existing data is copied into the appropriate schema structures of the upgraded repository and seed data is inserted into new schema structures of the upgraded repository.

5. The method of claim 1 wherein migrating further comprises:
prior to migrating, taking the seed data from a temporary table that includes the seed data; and
deleting the temporary table after migration of data is completed.

6. The method of claim 1 comprising:
comparing a version identifier of a desired upgrade to the original repository with a version identifier of the original repository; and
determining that the version identifier of the desired upgrade correlates with the version identifier of the original repository so that the upgrading method may be performed.

7. The method of claim 6 wherein determining comprising:
determining that the version identifier of the desired upgrade does not correlate with the version identifier of the original repository;
providing upgrade information, wherein the upgrade information identifies any necessary upgrades to be made to the original repository before the original repository is able to be upgraded with the desired upgrade; and
performing the upgrades identified in the upgrade information to the original repository.

8. The method of claim 1 wherein exporting, modifying, migrating, and validating are performed according to a set of instructions, wherein the set of instructions is ordered according to an execution sequence, and instructions execute one at a time according to the execution sequence, the method comprising:
counting each successfully executed instruction to produce a result;
detecting an error during the upgrading process; and
providing the result of the counting to identify a point of failure, wherein the point of failure is exactly where in the execution sequence the error occurred.

9. The method of claim 1 wherein the original repository is a SAN repository of storage area network data that describes components and connections of a storage area network according to a set of schema structures that define the SAN repository, wherein the method comprises:
exporting a copy of the SAN repository;
modifying the set of schema structures of the SAN repository to create a set of schema structures of the upgraded SAN repository, wherein schema structures not present after the upgrading process is complete are not deleted until migration of data is completed;
migrating data to the set of schema structures of the upgraded SAN repository, wherein data includes existing data describing a storage area network from the current SAN repository and seed data for the upgraded SAN repository, wherein existing data is copied into the appropriate schema structures of the upgraded SAN repository and seed data is inserted into new schema structures of the upgraded SAN repository; and
validating the set of schema structures of the upgraded SAN repository against a standard set of schema structures corresponding to a properly upgraded standard SAN repository to detect any errors.

10. The method of claim 1 wherein modifying comprises:
changing an existing schema structure of the original repository and adding a new schema structure to the set of schema structures of the original repository;
and wherein migrating comprises:
migrating data to the set of schema structures of the upgraded repository, wherein data includes existing data from the original repository and seed data for the upgraded repository, wherein existing data includes customized data defined by a user, wherein existing data is copied into the appropriate schema structures of the upgraded repository and seed data is inserted into new schema structures of the upgraded repository.

11. A computer system comprising:
a memory;
a processor;
a communications interface; and
an interconnection mechanism coupling the memory, the processor, and the communications interface, allowing communication there between;
wherein the memory is encoded with a storage area network (SAN) repository upgrade application, that when executed in the processor, provides a SAN repository upgrade process that upgrades an original SAN repository of data, wherein a repository is defined by a set of schema structures and data contained therein, by causing the computer system to perform the operations of:
exporting a copy of the original SAN repository;
modifying the set of schema structures of the original SAN repository to create a set of schema structures of the upgraded SAN repository, wherein schema structures not present after the upgrading process is complete are not deleted until migration of data is completed;
migrating data to the set of schema structures of the upgraded SAN repository, wherein data includes existing data from the original SAN repository and seed data for the upgraded repository, wherein existing data is copied into the appropriate schema structures of the upgraded SAN repository and seed data is inserted into new schema structures of the upgraded SAN repository;
creating a standard SAN repository through a full clean install; and
validating the set of schema structures of the upgraded SAN repository against a standard set of schema structures corresponding to the standard SAN repository to detect any errors.

12. The computer system of claim 11 wherein modifying comprises:
adding a new schema structure to the set of schema structures of the original repository;
and wherein migrating comprises:
moving data from an existing schema structure of the original repository to the added new schema structure; and
deleting the existing schema structure.

13. The computer system of claim 11 further capable of performing operations of:
comparing a version identifier of a desired upgrade to the original repository with a version identifier of the original repository;
determining that the version identifier of the desired upgrade does not correlate with the version identifier of the original repository;
providing upgrade information, wherein the upgrade information identifies any necessary upgrades to be made to the original repository before the original repository is able to be upgraded with the desired upgrade; and
performing the upgrades identified in the upgrade information to the original repository.

14. The computer system of claim 11 wherein the operations of exporting, modifying, migrating, and validating are performed according to a set of instructions, wherein the set of instructions is ordered according to an execution sequence, and instructions execute one at a time according to the execution sequence, the computer system further capable of performing operations of:
counting each successfully executed instruction to produce a result;
detecting an error during the upgrading process; and
providing the result of the counting to identify a point of failure, wherein the point of failure is exactly where in the execution sequence the error occurred.

15. The computer system of claim 11 wherein the original repository is a SAN repository of storage area network data that describes components and connections of a storage area network according to a set of schema structures that define the SAN repository, wherein the computer system is capable of performing operations of:
exporting a copy of the SAN repository;
modifying the set of schema structures of the SAN repository to create a set of schema structures of the upgraded SAN repository, wherein schema structures not present after the upgrading process is complete are not deleted until migration of data is completed;
migrating data to the set of schema structures of the upgraded SAN repository, wherein data includes existing data describing a storage area network from the current SAN repository and seed data for the upgraded SAN repository, wherein existing data is copied into the appropriate schema structures of the upgraded SAN repository and seed data is inserted into new schema structures of the upgraded SAN repository; and
validating the set of schema structures of the upgraded SAN repository against a standard set of schema structures corresponding to a properly upgraded standard SAN repository to detect any errors.

16. A computer program product, stored on a computer readable storage medium, to upgrade an original repository of data, wherein a repository is defined by a set of schema structures and data contained therein, the computer program product comprising:
computer program code for exporting a copy of the original repository;
computer program code for modifying the set of schema structures of the original repository to create a set of schema structures of the upgraded repository, wherein schema structures not present after the upgrading process is complete are not deleted until migration of data is completed;
computer program code for migrating data to the set of schema structures of the upgraded repository, wherein data includes existing data from the original repository and seed data for the upgraded repository, wherein existing data is copied into the appropriate schema structures of the upgraded repository and seed data is inserted into new schema structures of the upgraded repository; and
computer program code for validating the set of schema structures of the upgraded repository against a standard set of schema structures corresponding to a properly upgraded standard repository to detect any errors.

17. The computer program product of claim 16 wherein computer program code for modifying comprises:
computer program code for adding a new schema structure to the set of schema structures of the original repository;
and wherein computer program code for migrating comprises:
computer program code for moving data from an existing schema structure of the original repository to the added new schema structure; and
computer program code for deleting the existing schema structure.

18. The computer program product of claim 16 comprising:
computer program code for comparing a version identifier of a desired upgrade to the original repository with a version identifier of the original repository;

computer program code for determining that the version identifier of the desired upgrade does not correlate with the version identifier of the original repository;

computer program code for providing upgrade information, wherein the upgrade information identifies any necessary upgrades to be made to the original repository before the original repository is able to be upgraded with the desired upgrade; and computer program code for performing the upgrades identified in the upgrade information to the original repository.

19. The computer program product of claim 16 wherein computer program code for exporting, computer program code for modifying, computer program code for migrating, and computer program code for validating are performed according to a set of instructions, wherein the set of instructions is ordered according to an execution sequence, and instructions execute one at a time according to the execution sequence, the computer program product comprising:

computer program code for counting each successfully executed instruction to produce a result;

computer program code for detecting an error during the upgrading process;

computer program code for providing the result of the counting to identify a point of failure, wherein the point of failure is exactly where in the execution sequence the error occurred; and computer program code for resuming the upgrading process from the point of failure.

20. The computer program product of claim 16 wherein the original repository is a SAN repository of storage area network data that describes components and connections of a storage area network according to a set of schema structures that define the SAN repository, wherein the computer program product comprises:

computer program code for exporting a copy of the SAN repository;

computer program code for modifying the set of schema structures of the SAN repository to create a set of schema structures of the upgraded SAN repository, wherein schema structures not present after the upgrading process is complete are not deleted until migration of data is completed;

computer program code for migrating data to the set of schema structures of the upgraded SAN repository, wherein data includes existing data describing a storage area network from the current SAN repository and seed data for the upgraded SAN repository, wherein existing data is copied into the appropriate schema structures of the upgraded SAN repository and seed data is inserted into new schema structures of the upgraded SAN repository; and computer program code for validating the set of schema structures of the upgraded SAN repository against a standard set of schema structures corresponding to a properly upgraded standard SAN repository to detect any errors.

* * * * *